Figure 1:
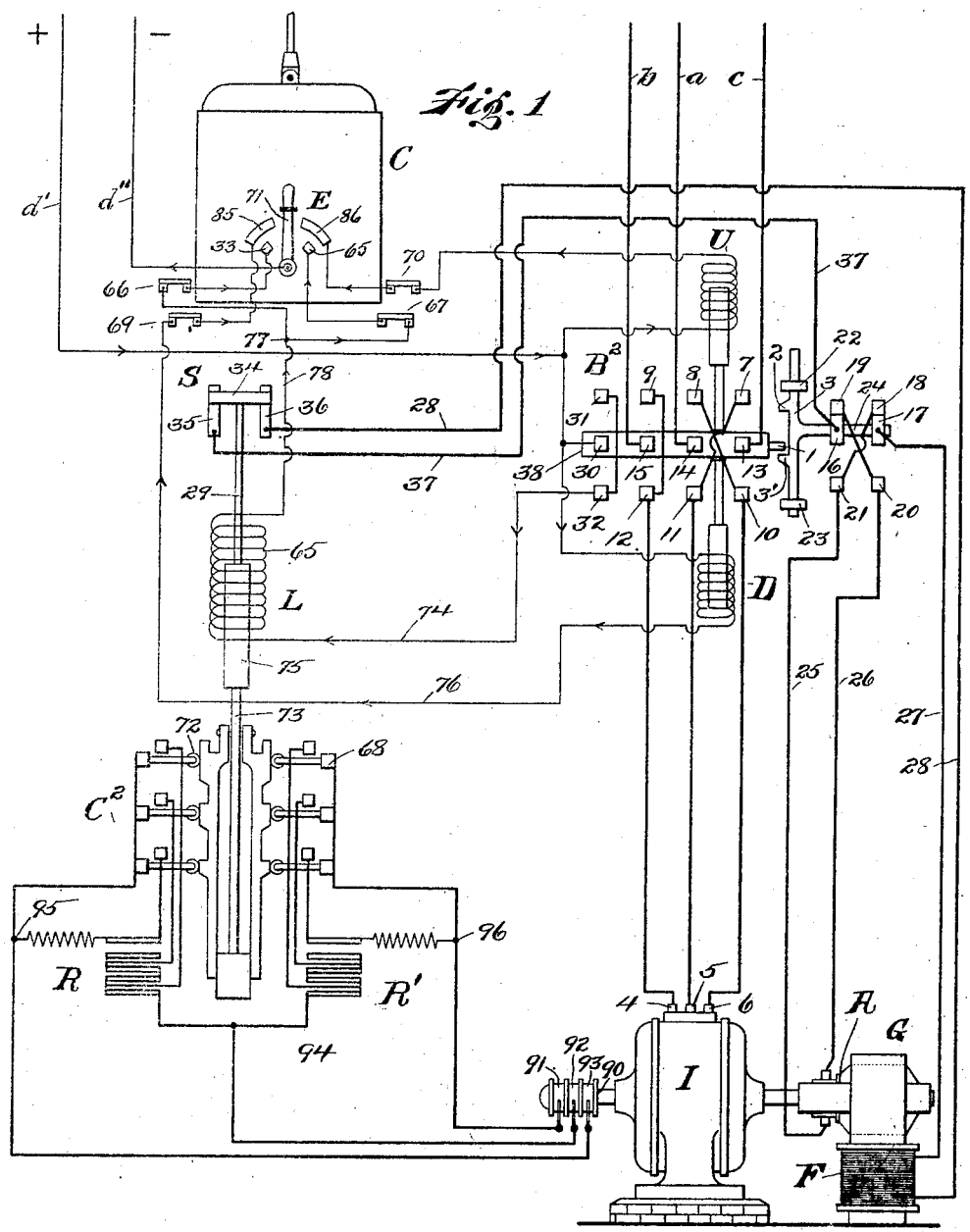

J. D. IHLDER.
MOTOR CONTROL.
APPLICATION FILED OCT. 11, 1905.

1,005,221.

Patented Oct. 10, 1911.

2 SHEETS—SHEET 1.

Witnesses
Walter C. Strang
Henry E. Kirby

Inventor
John D. Ihlder
By Chas. M. Nissen
Attorney

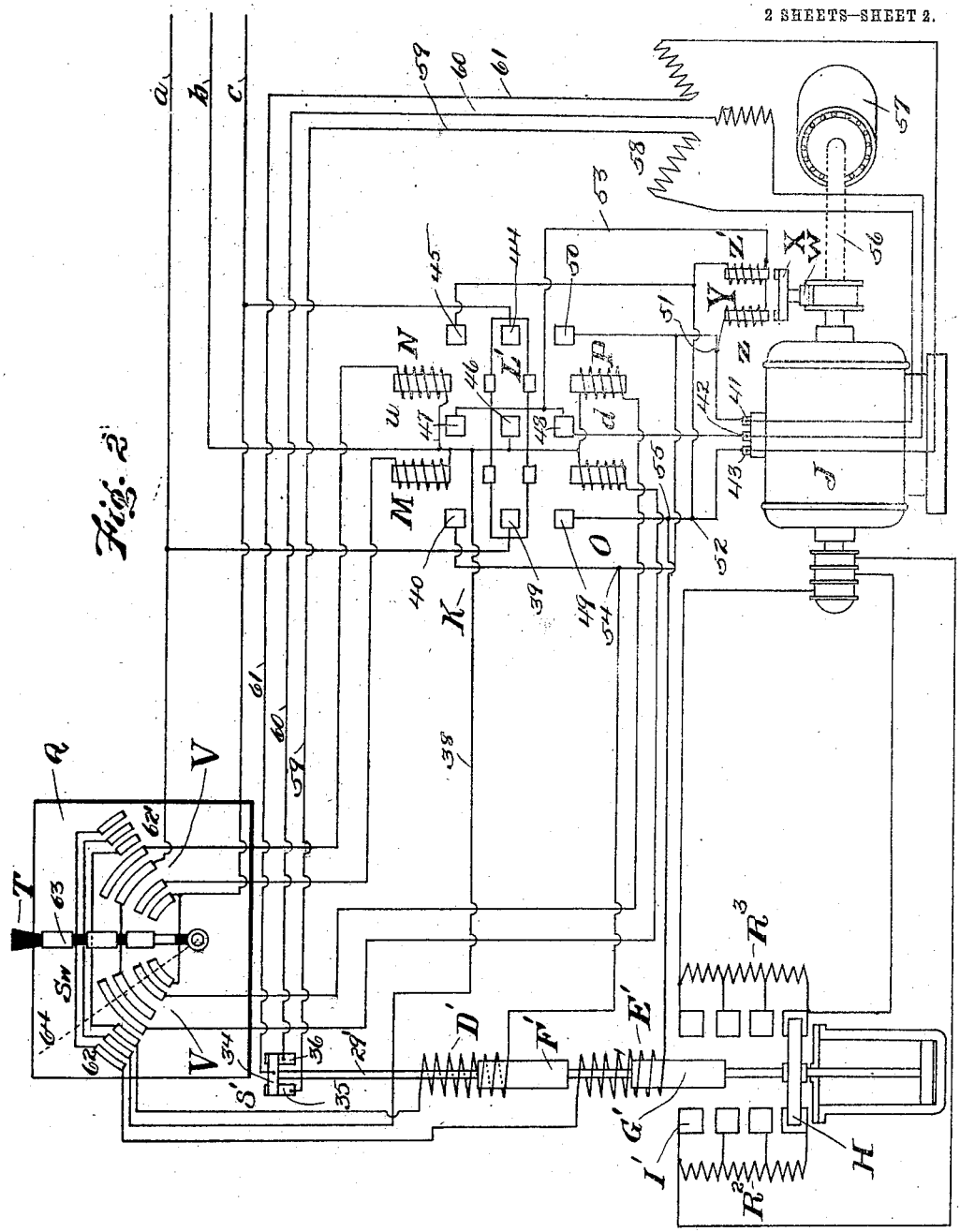

UNITED STATES PATENT OFFICE.

JOHN D. IHLDER, OF NEW YORK, N. Y., ASSIGNOR TO OTIS ELEVATOR COMPANY, OF JERSEY CITY, NEW JERSEY, A CORPORATION OF NEW JERSEY.

MOTOR CONTROL.

1,005,221.   Specification of Letters Patent.   Patented Oct. 10, 1911.

Application filed October 11, 1905. Serial No. 282,330.

*To all whom it may concern:*

Be it known that I, JOHN D. IHLDER, a citizen of the United States, residing at New York city, in the county of New York and State of New York, have invented a new and useful Improvement in Motor Control, of which the following is a specification.

My invention relates to means for controlling electric motors, particularly such motors as are adapted for the operation of elevator hoisting apparatus, but it is applicable to the control of motors in general.

One of the objects of my invention is the provision of an artificial power-consuming device to effect a quick reduction of all loads of an electric motor from a high speed to substantially the same reduced speed.

A further object of my invention is the provision of simple and efficient means for slowing down alternating-current induction motors by the use of power-consuming devices and means for controlling such devices.

Other objects of my invention will appear hereinafter, the novel combinations of elements being pointed out in the claims.

Referring to the drawings, Figure 1 illustrates diagrammatically the circuits and connections of the apparatus embodying my invention and as applied to an electric elevator system; and Fig. 2 represents a modification thereof.

Induction motor speed may be varied by introducing a resistance in the main line circuit, by introducing resistance in the rotor circuit, or by lowering the voltage of the supply circuit on condition that the motor does work, but if in elevator work lowering of the load drives the motor forward these means will be unavailable. I prefer, therefore, to employ an artificial power-consuming device to be brought into action simultaneously with a resistance device. This power-consuming device may be a mechanical friction brake, a rotary pump, a motor which runs unexcited for full speed and is excited only when slow speed is demanded, or any other like device. In any event it is desirable that the power-consuming device should vary its power with its speed, in order to give a quick reduction of the motor from high speed and to bring all loads to substantially the same reduced speed. The power-consuming devices may be controlled by a hand rope, wheel, switch, push-button with single-phase or multiphase magnets, &c. In the drawings I have illustrated in Figs. 1 and 2, respectively, a series-connected direct-current generator and an auxiliary induction motor, as power-consuming devices for accomplishing the function desired.

While my invention may be embodied in different forms and is applicable to different uses, I have illustrated it in connection with the control of a motor of an elevator or hoist, in this instance the motor I being shown as a multiphase induction motor, the direction of rotation of which is controlled by a reversing switch $B^2$ and the acceleration and retardation of which is controlled by an electro-magnetic switch $C^2$. The motor may be connected in any suitable manner to operate the car C, the mechanical connections for so operating the car being omitted for the sake of simplicity, it being understood that according to the direction of rotation of the motor the car is moved up or down along suitable stations, which may be floors or landings (not shown).

Motor-controlling circuits and apparatus are provided whereby the operation of the motor and the travel of the car may be controlled from the car. The primary or stator of the induction motor I is suitably connected from binding posts 4, 5, and 6 for the stator to suitable contacts 7, 8, 9, 10, 11 and 12 on the reversing switch $B^2$, the contacts 13, 14, and 15 being carried by a movable armature 38, actuated by suitable electro-magnets D and U in such manner that according to the direction of the current in the controlling circuits either the down magnet D or up magnet U will be energized to move the armature 38 to one side or the other of the center and complete the circuits of the motor in a direction to cause it to rotate as desired. The connection between the contacts 9, 12 and binding post 4 is never reversed; but the remaining connections to the binding posts 6 and 5 are reversed according to the movements of the switch $B^2$.

The alternating-current motor mains $a$ $b$ $c$ are connected to contacts 15, 14, and 13 on the reversing switch in order to effect the energization of the stator of the motor when the reversing switch $B^2$ is moved to either of its circuit-closing positions.

The switch E on the car is connected to complete a circuit to either the up magnet solenoid U or the down magnet solenoid D and is shown here in connection with a direct-current circuit, which when available is preferable for the operation of electric elevators, although alternating-current circuits and magnets can be used if necessary. In this instance $d'$ designates the positive lead, in branches of which are arranged the solenoids U and D, the return wires being connected to the contacts of switch E. Connection is made from the positive lead $d'$ to contact 30 of the reversing switch $B^2$, while a magnet L controlling the rotor-circuit controller $C^2$, is connected to contacts 31 and 32 on switch $B^2$, so that as said switch is operated the circuit of magnet L will be closed to operate the controller $C^2$, and also the switch S. The up magnet U actuates reversing switch $B^2$ to close the circuits of the stator to start the motor in the desired direction to move the car upwardly. The starting of the motor is, however, controlled by additional apparatus embodied in the starting switch $C^2$ which in this instance is that disclosed in my Patent No. 742,031, Oct. 20, 1903, electrical controlling apparatus. Any other suitable starting switch may be used, however, this form being shown here for illustration only.

After the motor has been operated the car may be slowed down and stopped at any time by the operation of the switch E. It will be seen that this switch comprises two short arc-shaped contact strips 33 and 65 and also two longer arc-shaped contact strips 85 and 86. When the switch lever 71 is moved to the right or left it first engages one of the longer contact strips which has the effect of closing the circuits to one of the reversing switch magnets. The reversing switch $B^2$ will therefore be operated to close the circuits of the stator of the induction motor I but only sufficient current is admitted to the stator to prevent backward rotation of the motor because the maximum starting resistance is connected in the rotor-circuit. When the reversing switch is thus closed, contact 30 is moved into contact with either of the fixed contacts 31 or 32, thereby connecting the plus lead $d'$ through wire 74 to the solenoid L, but the circuit is not completed to the minus lead $d''$ since the lever 71 is in engagement with only the longer contact strip 85 or 86. Upon a further movement of the lever 71, however, the contact 33 or 65 is engaged to effect the energization of the solenoid L. The plunger 75 will now be lifted, the switch S opened and the resistances R, R' gradually cut out from the rotor circuit.

The power-consuming device hereinbefore referred to comprises in this instance a series-wound generator G whose field F and armature A are connected in series with the switch S by means of suitable circuits. The switch S comprises fixed contact strips 35 and 36 and a movable bridge piece 34 which is rigidly connected by the stem 29 to the core 75 of the magnet L. As soon as the lever 71 is placed in one of its extreme positions, the reversing switch $B^2$ is operated to one of its circuit-closing positions to connect the mains $a$, $b$, $c$ to the motor terminals 4, 5, 6, respectively, and the magnet L is energized to move the core upwardly to disconnect the bridge piece 34 from the contact strips 35 and 36. This allows a free movement of the armature A which is mounted on an extension of the rotor shaft of the induction motor I, as the external circuit of the generator G is interrupted at the switch S.

Mounted adjacent the reversing switch $B^2$ and adapted to be controlled thereby is an additional switch for reversing the armature of the series-wound generator G. This switch comprises a sliding rod 3 mounted in the bearings 22 and 23 and provided with laterally extending lugs 2 and 3' which are adapted to be engaged by the pin 1 extending to the right from the armature 38. Extending from the central portion of the rod 3 is a contact-carrying arm 24 on which are mounted the contacts 16 and 17. These contacts may engage either the fixed contacts 19, 18, respectively, or the contacts 21, 20, respectively. The direct-current generator reversing switch makes the connection for this generator in correct relation with the induction motor connection and consequent direction of rotation of the induction motor. It should be noted that with this arrangement the direct-current generator connections at its reversing switch are not broken when the alternating-current motor reversing switch assumes its central or open-circuiting position. For instance, if the up-magnet U is operated, the contacts 16, 17 engage the contacts 19, 18, respectively, and when said magnet is deënergized the reversing switch $B^2$ is opened but the contacts 16 and 17 are not moved. The latter contacts will be again moved only when the down-magnet D is operated, in which case the contacts 16, 17 will engage the contacts 21, 20, respectively, to reverse the armature A of the generator G.

In order to slow down the induction motor I, the switch lever 71 in the car is moved toward central position so as to disengage said lever 71 and either the contact 33 or 65 as the case may be. The circuit through the solenoid L will thus be interrupted but the circuit through one of the reversing switch magnets is still maintained through the contact strip 85 or 86 and the lever 71 which is connected to the negative main. The plunger 75 no longer being held up by the solenoid L will slowly descend to effect a gradual introduction of the resistances R, R' in circuit with the rotor of the induction motor I. After all or nearly all of the resistances have been reinserted, the switch S is closed by the bridge piece 34 connecting the contact strips 35 and 36. The series generator G will now have its circuit closed from armature A by way of wire 26 to and through fixed contacts 20 and 19, movable contact 16, wire 37, contacts 35, 36 and bridge piece 34, wire 28, field coil F, wire 27, movable contact 17, fixed contacts 18 and 21, wire 25, back to armature A. This circuit in reality constitutes an electro-dynamic brake circuit.

If the contacts 16, 17 are in engagement with the contacts 21 and 20, respectively, when the induction motor I, operating in the opposite direction, is desired to be slowed down, it is obvious that the direction of the current through the armature A will be reversed, for in this case, the circuit must be traced from the armature A through wire 25 and thence through contacts 21 and 16 and by way of wires 37 and 28 to the field coil F. It is necessary to reverse the armature of the series generator G for the reason that the induction motor I rotates in one direction to move the car upwardly, and in the opposite direction to move the car downwardly. The residual magnetism in the series generator G must be kept the same, whether the said generator is supplying current to the circuits 26, 27, etc., in one direction or another. That is, the polarity of the poles of the series-generator G must be kept the same and this is accomplished by reversing the armature A connections when the direction of rotation of the armature A is changed with that of the rotor of the induction motor I. If the car is stopped and then started again, and moved in the same direction as before, obviously, it is not necessary to change the connections of the armature A, so the series generator reversing switch is left in the same position as before. The slowing down of the induction motor I may also be accomplished automatically by means of the switches 66 and 67 which are respectively connected to the contacts 33 and 65 and to wire 78 at 77. The switch 67 may be opened by the car itself or by some part of the hoisting mechanism as the car approaches a predetermined point in its upward travel. In a similar manner the switch 66 may be automatically operated to slow down the car when it approaches a predetermined point in its downward travel. In either case it is evident that the magnet L will be deënergized, thus effecting the re-insertion of the resistances R, R' in the motor-rotor circuits and the closing of the switch S of the generator circuit, although the lever 71 still remains in either of its extreme positions. I have also provided automatic limit switches 69 and 70 which when opened by the car or by some part of the hoisting mechanism will effect an automatic stopping of the car at its limits of travel. The switch 69 is connected to contact strip 85 and by wire 76 to the down-magnet D, and the switch 70 is connected to the contact 86 and the up-magnet U. The opening of switch 69 will therefore have the effect of deënergizing the magnet D and breaking the motor circuits, while the opening of the switch 70 will effect the deënergization of the magnet U and also the breaking of the motor circuits. Preferably the switches 66 and 69 are operated successively to slow down and stop the car at its lower limit of travel while the switches 67 and 70 are operated successively to slow down and stop the car at its upper limit of travel.

In Fig. 2 I have shown my invention applied to the circuits and connections of the apparatus illustrated in Fig. 4 of my Patent No. 780,104, patented Jan. 17, 1905, and entitled "Electric controlling apparatus", but this is done by way of illustrating my invention, as it may be applied to other systems than that shown in said patent if desired. An auxiliary induction motor comprising a squirrel-cage armature 57 and a stator winding 58 is directly connected by means of the shaft 56 to the rotor of the induction motor J. The stator winding 58 is connected in parallel with the stator winding of the main motor J, being connected to the motor terminals 41, 42 and 43. The stator winding 58, in this instance, is shown as star-connected, but the common connecting point is extended to the switch S' which is normally closed, but is opened as soon as the induction motor J is started. The auxiliary induction motor will therefore run free while the motor J is operated to move the hoisting mechanism in the desired direction. When it is desired to slow down the motor J the switch S' is permitted to be automatically closed as the resistances R², R³, are again inserted in the rotor circuit of the induction motor J.

It should be noted that the connections of the auxiliary motor are interchanged together with the connections of the induction motor J and the auxiliary motor's connections are such that this auxiliary motor tends to rotate reversely to the induction motor when the switch S' is closed. In this instance, the connections between the mains and the stator of the induction motor J as well as those of the stator 58 are changed by the reversing switch K but other means may be used for securing a reversal of the auxiliary induction motor when the main motor is reversed. For example, the connections of the auxiliary motor may be made by a special switch as that shown in Fig. 1 for reversing the series generator G, in which case the auxiliary motor could be kept energized to slow down the main motor even after the circuits to the latter motor have been entirely interrupted.

As explained in the patent last referred to, the two windings D' E' are provided with two cores F' G'. These cores are rigidly connected with each other and are provided with the contact arm H which is adapted to travel over the contacts I' for cutting in and out the resistances R², R³, in the rotor circuit of the elevator motor J. Also connected with the cores F' G' so as to move therewith is the stem 29' the upper end of which carries the bridge piece 34 for electrically connecting the contacts 35 and 36. The contacts 35 and 36 and the bridge piece 34 are connected respectively by the wires 59, 60 and 61 to the stator winding 58 of the auxiliary induction motor.

J is shown in Fig. 2 as a three phase motor of the induction type, and two of the phases are led to the windings D' and E' of the switch magnet, one phase passing through the winding D' and another through the winding E', so that there is always magnetism in one or the other of the windings for maintaining the armature F' or G' attracted, and thus cutting out the resistances R² R³ from the rotor circuit. The motor J may be any suitable alternating-current motor.

K represents a reversing switch for the motor, the armature L' of which is connected to be controlled by the up-magnets u and down-magnets d, each of which magnets u and d comprises two alternate current windings M N and O P. One winding of each magnet is connected to receive one phase of the alternating current supply, and the other winding is connected to receive another phase, so that when the armature L' of the switch K has been attracted there will always be magnetism in one of the windings of magnets u or d to maintain the said core attracted and prevent chattering and consequent noise and loss of efficiency.

a b c represent the alternating current supply mains. Q represents the car diagrammatically, provided with a switch Sw comprising the hand lever T and contacts V, 62 and 62'. The contacts V are so connected with the mains a b c, the reversing switch K, and the stator of the motor J that according to the direction in which T is moved magnets u or d will be energized, the reversing switch operated, and the motor J started in one direction or the other to move the car up or down, as desired. Any suitable operative connections may be provided between the motor and the car for raising and lowering the car from the motor.

In the operation of the apparatus, if the lever T of the switch Sw be moved to its extreme right-hand or left-hand position so the insulated contact 63 will connect the contacts 62 or 62' a circuit will be completed from the main a, upon which one phase of the current is impressed, through contacts V, winding N of magnet u, and back to the common return b. A circuit will also be completed from the main c upon which another phase of the alternating current is impressed through contacts V and winding M of magnet u and back to the common return b. Thus the windings M and N of magnets u each receive a different phase of the current and the armature L' of the reversing switch K will be attracted, thereby completing the circuits to the motor for causing it to rotate in a direction to move the car upwardly. When the armature L' is attracted by magnet u, one circuit will be completed from the main a, through contacts 39 and 40 to binding-post 41 on the motor; another circuit will be completed from the main c, through the contacts 44 and 45 to the binding-post 43 on the motor; and the third will be completed from the common return b, through contacts 46 and 47 to the binding-post 42 on the motor. When the armature L' is attracted by magnet d, the circuit for the common return b to the binding-post 42 on the motor is completed as before, but now through contacts 46 and 48; but the connections to binding-posts 41 and 43 are reversed, for a circuit is completed from the main a through contacts 39 and 49 to binding-post 43, and another circuit is completed from the main c, through contacts 44 and 50 to binding-post 41, thus causing the motor to rotate in the opposite direction and move the car downwardly.

The stator windings 58 of the auxiliary induction motor being also connected to the binding-posts 41, 42 and 43 will also have two of its windings reversed whenever the elevator motor J is reversed. The auxiliary motor has its stator windings so connected that when the switch S' is brought back to circuit-closing position by the movement of the switch lever T to its dotted line position 64, said auxiliary motor will act in opposition to the motor J which at this time may be momentum driven. The motor J can therefore be effectually slowed down by the automatic operation of the switch S'. It should be noted furthermore that when the switch Sw is in its dotted line position 64 the reversing switch last operated is still held in circuit-closing position and, therefore, the motor J is being supplied with operating current from the mains a b c; but the entire starting resistance is inserted in the rotor circuit of the motor J, and besides, the auxiliary motor is acting in opposition to said motor J. During this time the brake W is held in releasing position and the brake is only applied when the lever T is brought back to its normal or open-circuiting position. Brake W is shown provided with an armature X controlled by the brake magnet Y, provided with windings Z and Z', each winding being supplied with current of different phase, so that strong magnetism is always provided for the brake. As will be seen, the winding Z is connected at the point 51 to the connector for the binding-post 41 and winding Z' is connected at the point 52 to the connector for binding-post 43, while a single wire 53 connects both the windings Z and Z' with contacts 47 and 48, which complete the circuit to the common return main b.

When the hand lever T is moved to either of its extreme positions circuits will be completed to the windings D' and E' of the switch controlling resistances R² and R³. It will be seen that the winding D' is connected at the point 54 with the electrical connections leading to the binding-post 41, while winding E' is connected at the point 55 with the electrical connections leading to the binding-post 43. A common lead 38 connects both windings D' and E' with the common return b of the alternating-current mains. It will, therefore, be seen that different phases of alternating current will always pass through windings D' and E' no matter in which direction the motor may be rotated.

Obviously, variations in the details of construction and arrangement of parts may be made by those skilled in the art without departing from the spirit and scope of my invention. I, therefore, do not desire to be limited to the exact construction herein disclosed.

What I desire to have protected by Letters Patent of the United States, and claim as my invention is:—

1. The combination with a motor, of means for supplying current to said motor from a source of electricity, a second source of electricity dependent upon the motor, and means for controlling the flow of current from said second source to cause the same to retard the speed of the motor while the current supply is cut off from the motor.

2. The combination with an alternating current motor, of a source of current independent of the motor circuits, and means for varying the circuit for said current at will to cause said source of current to retard the motor while the latter is running on open circuit.

3. The combination with an alternating current motor, of reversing switches therefor, accelerating apparatus for said motor, an electric power-consuming device, and automatic means associated with said accelerating apparatus for controlling said device to cause the same to directly retard the action of said motor.

4. The combination with a motor, of starting resistance therefor, means for varying said resistance, an external electric power-consuming device for directly retarding the action of said motor when desired, and means co-acting with said resistance-varying-means for controlling said device.

5. The combination with an alternating current electric motor, of starting resistance therefor, means for gradually cutting out or short-circuiting said resistance as the motor increases in speed, an external electric power-consuming device, and means for controlling said device to cause the same to retard the action of said motor after part or all of said resistances have been re-inserted.

6. In an elevator, the combination with a car, of an alternating current motor and hoisting apparatus for moving the car, a generator operated by the motor, accelerating apparatus for the motor, means for controlling said accelerating apparatus from the car, and means co-acting with said accelerating apparatus to cause said generator to substantially retard said motor.

7. The combination with an electric motor, of a generator operated by said motor, starting resistance, means for cutting out said starting resistance to effect the acceleration of the motor, and means operable upon the reinsertion of said resistance to cause said generator to materially retard said motor.

8. The combination with an electric motor, of generator connected to said motor, accelerating apparatus for said motor, means co-acting with the accelerating apparatus for causing said generator to slow down said motor, and a single device for controlling both the accelerating apparatus and said slowing down means.

9. The combination with an electric motor, of sectional starting resistance therefor, electro-magnetic switch apparatus for cutting out one or more sections of said resistance, a local source of current dependent upon the motor, means co-acting with said electro-magnetic switch apparatus for varying the current from said local source, and a single device for controlling both the electro-magnetic switch apparatus and said current-varying means.

10. The combination with a motor, of a series-wound generator associated therewith, and means for automatically controlling said generator to cause the same to act as an electro-dynamic brake for slowing down said motor.

11. The combination with an electric motor, of motor-controlling means, a series wound generator directly connected to said motor, and means co-acting with said motor-controlling-means to cause said generator to stop the motor by producing an electro-dynamic braking action thereon.

12. The combination with an alternating current motor, of a source of alternating current supply therefor, a direct current generator having an armature winding and a field winding, said generator being connected to run with the motor, and means for connecting the generator windings and causing the generator to produce a braking effect upon the motor when the current supply is cut off from the motor.

13. The combination with an alternating current motor, of an elevator mechanism driven thereby, a source of alternating current supply for the motor, a direct current generator connected to run with the motor, said generator having an armature winding and a field winding, and means for connecting said generator windings and causing the generator to produce a braking effect on the motor when the current supply is cut off from the motor.

14. The combination with a motor, of a generator connected to run with the motor, said generator having an armature winding and a field winding arranged to be connected together and to produce a braking effect upon the motor proportional in strength to the speed of the motor, when power is cut off from the motor.

15. The combination with a motor, of a series-wound generator associated therewith, a reversing switch for said motor, an additional reversing switch for said generator and operated by said motor-reversing switch, and means for automatically controlling said generator to cause the same to act as a brake for said motor.

16. The combination with a motor, of a generator connected thereto, starting resistances for said motor, electro-magnetic means for controlling said resistances, and a switch operated by said means for closing the circuit of the generator to cause the same to act as a brake for the motor.

17. The combination with a motor, of a series-wound generator driven by said motor, co-acting reversing switches for said motor and generator, starting and accelerating means for said motor, electro-magnetic means for controlling said accelerating means, and a circuit-closer for the generator circuit and automatically actuated upon the release of said electro-magnetic means to effect a slowing down of said motor by the generator.

18. The combination with an alternating current motor, of a direct current generator associated therewith, motor-controlling means, and a switch co-acting with said last-named means to close the generator circuit to cause the same to act as an electro-dynamic brake for said motor.

19. The combination with an induction motor, of starting resistances connected to the rotor circuits, means for controlling said resistances, a direct current generator driven by said motor but normally running free, and means operated by said controlling-means to close a circuit of low resistance between the terminals of said generator to cause the same to act as an electro-dynamic brake for said motor.

20. The combination with an induction motor, of starting resistances connected to the rotor circuits, electro-magnetic means for controlling said resistances, a direct-current generator connected to said motor, and a switch operated by said electro-magnetic means to close the circuit of said generator only after part or all of said resistances are inserted in the rotor circuit.

21. The combination with a motor, of controlling means therefor, a direct current generator associated with said motor, and automatic means for controlling the armature circuit of said generator to act as a brake for said motor when the circuits to said motor are opened.

22. The combination with an alternating current motor, of a direct current generator associated therewith, and means for closing the circuit of said generator when the supply current to said motor is cut off.

23. The combination with an elevator car and its motor, of motor-controlling means, of a direct current self-exciting generator associated with said motor and running unexcited when the motor runs at full speed and automatic means for controlling said generator to excite the same and assist in slowing down said motor.

24. The combination with an elevator car and its motor, of motor-controlling means, an electro-dynamic machine connected to said elevator motor, and running with little retardation when the motor runs at full speed, a circuit for the said machine, and means for controlling said circuit to cause said electro-dynamic machine to directly apply a load on the motor to assist in reducing the speed thereof.

25. The combination with a motor, of a generator, and automatic means for controlling the flow of current from said generator to directly and materially retard said motor while the motor is being brought to rest.

26. The combination with a motor, of controlling means therefor, a self-exciting direct-current generator associated with said motor, and means for controlling said generator to act as a brake for said motor when the circuits to said motor are opened.

27. The combination with a motor, of a series wound generator associated therewith, and means for automatically controlling said generator to cause the same to run free while the motor is running at normal speed and to act as an electro-dynamic brake for slowing down said motor.

28. The combination with a motor, an electrodynamic brake associated therewith, and means for automatically rendering said brake ineffective when the motor circuit is opened.

29. The combination with a motor, of reversing switches therefor, an electrodynamic brake, and automatic means for substantially simultaneously opening the reversing switches and the circuit of said electrodynamic brake.

30. The combination with a motor, of reversing switches for the motor, an electrodynamic brake, a relay controlling the electric circuit of the brake, and means whereby said relay and a reversing switch are operated substantially simultaneously.

31. The combination with a motor, of a reversing switch for the motor, an electrodynamic brake, a relay controlling the circuit of the brake, and automatic means for effecting the opening of said reversing switch and operating said relay to open the circuit of the brake substantially simultaneously.

32. The combination with an alternating current motor, of a generator, and means for controlling the flow of current from said generator to materially retard said motor while the circuit of the motor is open.

33. A motor, a generator connected to run with the motor, said generator having an armature winding and a field winding arranged to be connected together and to produce a braking effect upon the motor proportional in strength to the speed of the motor, when power is cut off from the motor.

34. In an elevator, the combination with a car, of an alternating current motor and hoisting apparatus for moving the car, a generator operated by the motor, accelerating apparatus for the motor, means for controlling said accelerating apparatus from the car, and means co-acting with said accelerating apparatus to cause said generator to substantially retard said motor.

35. The combination with an electric motor, of a generator connected to said motor, accelerating apparatus for said motor, means co-acting with the accelerating apparatus for causing said generator to slow down said motor, and a single device for controlling both the accelerating apparatus and said slowing down means.

36. An alternating current motor, a source of alternating current supply therefor, a direct current generator having an armature winding and a field winding connected to run with the motor, and means for connecting the generator windings and causing the generator to produce a braking effect upon the motor when the current supply is cut off from the motor.

37. An alternating current motor, a source of alternating current supply therefor, a brake, a direct current generator connected to run with the motor, and means for causing the generator to produce an electrodynamic braking effect upon the motor and to apply the brake to the motor when the current is cut off from the motor.

38. The combination with an electric motor, of a source of electrical supply connected to the motor, a generator connected to run with the motor, said generator having an armature winding and a field winding, and means for cutting off the electrical supply from the motor and for connecting the armature and field windings of the generator while the motor supply is cut off.

39. The combination with an alternating current motor, of a source of alternating current supply therefor, a direct current generator having an armature winding and a field winding said generator being connected to run with the motor, and means for connecting the generator windings and causing the generator to produce a braking effect upon the motor when the current supply is cut off from the motor.

40. The combination with an alternating current motor, of an elevator mechanism driven thereby, a source of alternating current supply for the motor, a direct current generator connected to run with the motor, said generator having an armature winding and a field winding, and means for connecting said generator windings and causing the generator to produce a braking effect on the motor when the current supply is cut off from the motor.

41. The combination with a motor, of a generator connected to run with the motor, said generator having an armature winding and a field winding arranged to be connected together and to produce a braking effect upon the motor proportional in strength to the speed of the motor, when power is cut off from the motor.

42. An alternating current motor, an elevator mechanism driven thereby, a source of alternating current supply for the motor, a direct current generator connected to run with the motor having an armature winding and a field winding, and means for connecting said generator windings and causing the generator to produce a braking effect on the motor when the current supply is cut off from the motor.

In testimony whereof, I have signed my name to this specification in the presence of two subscribing witnesses.

JOHN D. IHLDER.

Witnesses:
FRANK T. BROWN,
CHARLES M. NISSEN.